United States Patent
Hottinen

(10) Patent No.: US 8,842,581 B2
(45) Date of Patent: Sep. 23, 2014

(54) METHOD, A DEVICE AND A SYSTEM FOR DUPLEX COMMUNICATIONS

(75) Inventor: Ari Hottinen, Espoo (FI)

(73) Assignee: Nokia Corporation, Espoo (FI)

( * ) Notice: Subject to any disclaimer, the term of this patent is extended or adjusted under 35 U.S.C. 154(b) by 1414 days.

(21) Appl. No.: 10/592,899

(22) PCT Filed: Mar. 16, 2004

(86) PCT No.: PCT/FI2004/000150
§ 371 (c)(1),
(2), (4) Date: Jul. 11, 2008

(87) PCT Pub. No.: WO2005/088866
PCT Pub. Date: Sep. 22, 2005

(65) Prior Publication Data
US 2008/0279125 A1 Nov. 13, 2008

(51) Int. Cl.
| H04B 7/005 | (2006.01) |
| H04J 13/00 | (2011.01) |
| H04B 1/44 | (2006.01) |
| H04L 5/14 | (2006.01) |
| H04W 4/00 | (2009.01) |
| H04B 7/216 | (2006.01) |
| H04J 1/00 | (2006.01) |
| H04B 7/212 | (2006.01) |
| H04J 3/17 | (2006.01) |
| H04J 4/00 | (2006.01) |
| H04L 12/43 | (2006.01) |
| H04J 3/02 | (2006.01) |
| H04L 12/66 | (2006.01) |
| H04W 16/00 | (2009.01) |
| H04B 7/26 | (2006.01) |
| H04L 1/00 | (2006.01) |

(52) U.S. Cl.
CPC ............. *H04W 16/00* (2013.01); *H04L 1/0009* (2013.01); *H04L 1/0003* (2013.01); *H04B 7/2615* (2013.01); *H04B 7/265* (2013.01)

USPC ........... 370/278; 370/281; 370/282; 370/295; 370/330; 370/342; 370/343; 370/347; 370/433; 370/436; 370/442; 370/458; 370/462; 370/463; 370/478; 370/479; 370/480

(58) Field of Classification Search
CPC .. H04B 1/50; H04B 2001/44; H04B 2001/40; H04L 5/18; H04L 5/26; H04J 4/00
USPC ......... 370/276–278, 280–282, 294–296, 310, 370/328–330, 339, 343–345, 347–348, 350, 370/431, 433, 436–437, 442, 458, 462–464, 370/478–480, 498, 503
See application file for complete search history.

(56) References Cited

U.S. PATENT DOCUMENTS 5,475,677 A * 12/1995 Arnold et al. ................. 370/280
6,272,117 B1 * 8/2001 Choi et al. ..................... 370/330

(Continued)

FOREIGN PATENT DOCUMENTS

| EP | 1 259 092 A2 | 11/2002 |
| WO | WO 99/26437 | 5/1999 |
| WO | WO 99/38343 | 7/1999 |

OTHER PUBLICATIONS

A. Hottinen, "Multiuser Scheduling with Matrix Modulation", Proceedings of IEEE ISSPIT 2003, Dec. 2003 Darmstadt Germany.

(Continued)

*Primary Examiner* — Omar Ghowrwal
(74) *Attorney, Agent, or Firm* — Harrington & Smith

(57) ABSTRACT

A method, a device, and a system for duplex communications. Uplink and downlink frequencies are allocated in an orthogonal manner such that at one time instant a certain carrier frequency is used for uplink (downlink) transmission and at some other time instant for downlink (uplink) transmission. Correspondingly, at said one time instant a second carrier frequency is used for downlink (uplink) transmission and at said some other time instant optionally for uplink (downlink) transmission.

60 Claims, 6 Drawing Sheets

(56) References Cited

U.S. PATENT DOCUMENTS

| | | | |
|---|---|---|---|
| 6,389,295 B1* | 5/2002 | Ramesh | 455/517 |
| 6,584,302 B1 | 6/2003 | Hottinen et al. | 455/69 |
| 6,839,333 B1* | 1/2005 | Åkerberg | 370/330 |
| 6,847,629 B2* | 1/2005 | Razoumov et al. | 370/349 |
| 6,859,655 B2* | 2/2005 | Struhsaker | 455/450 |
| 7,092,372 B1* | 8/2006 | Jensen et al. | 370/337 |
| 7,336,626 B1* | 2/2008 | Barratt et al. | 370/281 |
| 7,339,926 B2* | 3/2008 | Stanwood et al. | 370/375 |
| 2002/0106015 A1* | 8/2002 | Zehavi | 375/225 |
| 2002/0173277 A1* | 11/2002 | Takao et al. | 455/77 |
| 2003/0195016 A1* | 10/2003 | Periyalwar | 455/562.1 |
| 2003/0207690 A1* | 11/2003 | Dorenbosch | 455/445 |
| 2004/0062206 A1* | 4/2004 | Soong et al. | 370/252 |
| 2004/0101037 A1* | 5/2004 | Meng | 375/220 |
| 2006/0018289 A1* | 1/2006 | Schulist et al. | 370/335 |

OTHER PUBLICATIONS

A. Hottinen et al., "Precoder Designs for High Rate Space-Time Block Codes", 2004 Conference on Information and Sciences and Systems, Princeton University, Mar. 17-19, 2004.

A. Hottinen et all, Multi-Antenna Transceiver Techniques for 3G and Beyond, Chapter 10, "Closed Loop Methods", 2003 John Wiley & Sons, Ltd.

A. Hottinen et all, Multi-Antenna Transceiver Techniques for 3G and Beyond, Chapter 11 "Analysis of Closed Loop Concepts", 2003 John Wiley & Sons, Ltd.

A. Hottinen et all, Multi-Antenna Transceiver Techniques for 3G and Beyond, Chapter 12 "Hybrid Closed-Loop and Open-Loop Methods", 2003 John Wiley & Sons, Ltd.

* cited by examiner

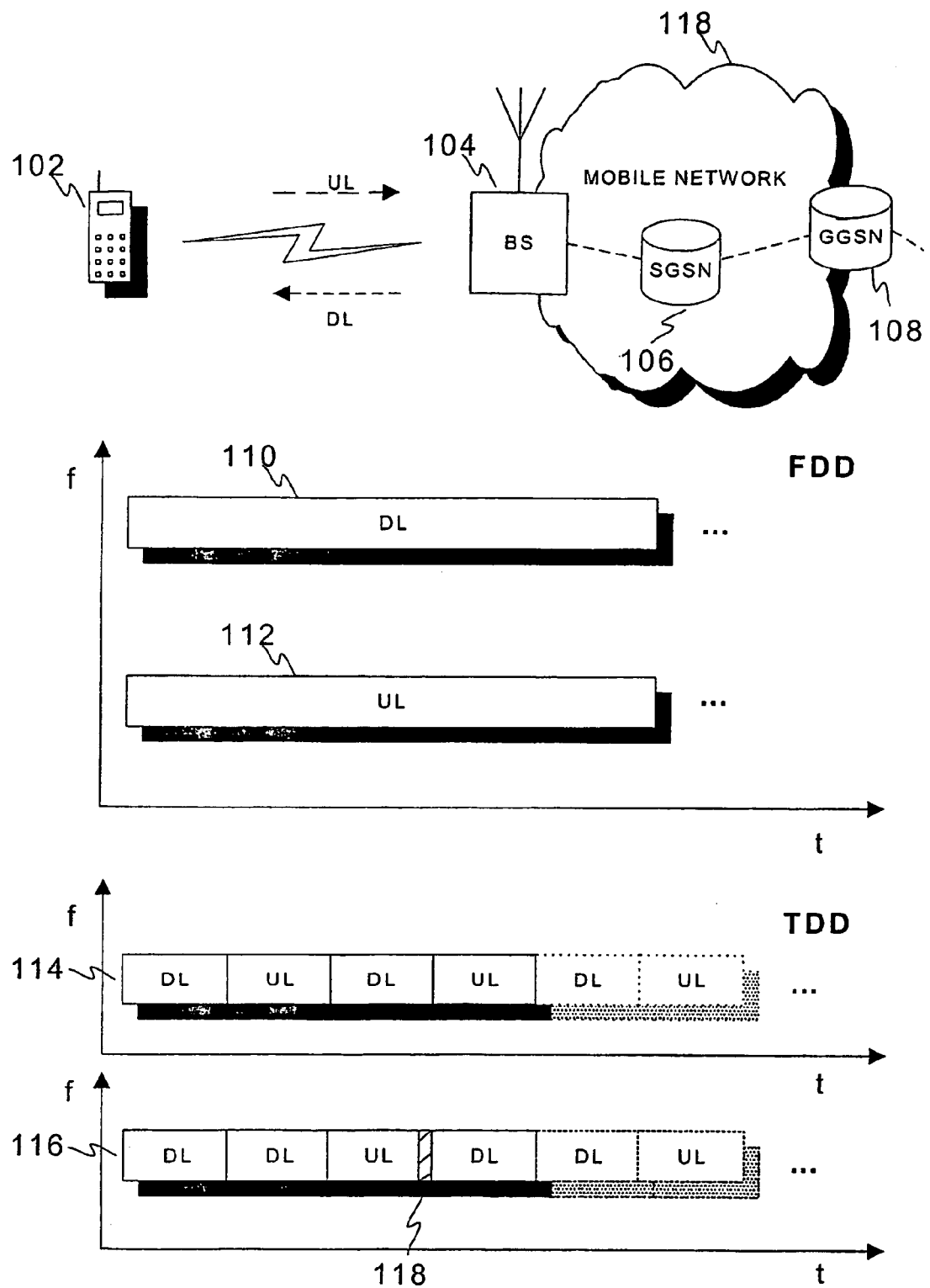
Figure 1        PRIOR ART

METHOD, A DEVICE AND A SYSTEM FOR DUPLEX COMMUNICATIONS

FIELD OF THE INVENTION

The present invention relates generally to communication systems. In particular the invention concerns air interfaces of wireless communications networks and duplexing methods thereof.

BACKGROUND OF THE INVENTION

Modern wireless communications systems such as the widely adopted GSM (Global System for mobile communications) and the UMTS (Universal Mobile Telecommunications System), which has been selected as the European third generation mobile communications standard, are capable of transferring various types of data over the air interface between the network elements such as a base station and a mobile terminal. For that purpose, both the GSM and UMTS utilize a mature duplex transmission method called FDD (Frequency Division Duplex) in which uplink and downlink transfer directions are realized on two different frequency bands (~paired bands). FDD thus employs frequency domain separation of transfer directions and enables continuous two-way transmission. In addition to the FDD assigned typically for macro- and microcells the UMTS specification includes also a mode supporting more recent TDD (Time Division Duplex) technology for time domain separation of transfer directions to be used with unpaired frequency bands and providing mainly local area access in reference to picocells etc with a higher user density. In the UMTS frequency bands 1920-1980 MHz (uplink) and 2110-2170 MHz (downlink) have been paired for FDD operation meanwhile frequency ranges 1900-1920 MHz and 2010-2025 MHz are targeted to TDD operation.

The FDD and TDD concepts are further clarified with the help of FIG. 1 wherein a wireless communications device such as a mobile terminal or a communication enabled PDA (Personal Digital Assistant) 102 is connected to mobile network 118 that may be internally divided to a radio access network and a core network as in UMTS. A network element communicating directly with wireless communications device 102 is in this example called a base station 104 that forwards, e.g. in the case of GPRS (General Packet Radio Service), the data received from SGSN (Serving GPRS support Node) 106 and originally delivered by GGSN (Gateway GPRS Support Node) 108 finally to wireless communications device 102 over the air interface by exploiting the active DL (downlink) connection. Accordingly, wireless communications device 102 may send data to network side 118 by utilizing an established UL (uplink) connection.

The originated UL/DL data transfer may be realized through both FDD and TDD techniques. Should the FDD be selected, UL 112 and DL 110 transfer directions are separated in relation to their carrier frequencies. Thus these two bands having either equal or differing bandwidths with necessary separation called a guard-band are used for duplex data transfer. Paired bands solution is ideal for symmetric traffic like voice communications and video conferencing but as a downside, truly flexible and dynamic bandwidth allocation between UL and DL transfer resources is either impossible or relatively complex to implement.

For supporting multiple access either in a FDD or TDD based network, for example, TDMA (Time Division Multiple Access) technique as in the GSM system or (W)CDMA ((Wideband) Code Division Multiple Access) technique as in the UMTS system, or even both simultaneously (e.g. UMTS TDD), may be used. Furthermore, FDMA (Frequency Division Multiple Access) technique can be applied whenever a plurality of carriers exists for a transfer direction.

TDD approach supports relative altering of UL/DL capacity and that way asymmetrical traffic more easily than FDD as the UL and DL directions share the same frequency and the required separation occurs in temporal domain by allocating a single carrier for two distinctive sets of time slots, one for each direction. Time slots may be dynamically allocated in an identical manner for symmetric traffic 114, or alternatively, in an unbalanced manner 116 for e.g. typical Internet traffic (Web surfing application: heavy downlink traffic, almost non-existent uplink control data) in which case either the UL or DL direction may dominate over the other one as to the time use. Frequency resources are thus not pointlessly reserved for a passive transfer direction. As a drawback, TDD implies discontinuous transmission for both ends of a connection, and a risk of interference introduced between the transfer directions arises due to possibly overlapping UL/DL transmission. Guard period 118 (illustrated in the figure for a single UL time slot only for clarification purposes) is typically used in the end of each slot to avoid overlaps.

Publication WO99/38343 discloses an arrangement supporting both time and frequency division duplex technologies to enhance spectrum usage in multi-cell environments. Two base stations located in neighbouring cells but with a geographical separation may use the same frequencies in such a manner that the first base station having a connection to a first mobile station transmits at a certain time instant by utilizing a first frequency while the second base station having a connection to a second base station transmits (or receives) by utilizing a second frequency. Next, the first base station receives data on the second frequency while the second base station receives (or transmits) data on the first frequency. Then the above cycle restarts.

Notwithstanding the various existing data transfer arrangements that may even utilize different types of data connections and duplexing methods to some extent, situations still occur whereto none of the prior art methods seems to fit particularly well. On the other hand, neither TDD nor FDD provide the system with pure benefits as presented hereinbefore.

SUMMARY OF THE INVENTION

The object of the present invention is to alleviate the defects found in prior art arrangements and to offer a new method, a device, and a system positioned in the contextual vicinity of previously known TDD and FDD solutions. It enables duplex communications between two or more transceiver units in a way combining and enhancing many advantages of both TDD and FDD techniques.

In a basic concept of the invention, wherein two transceiver units communicate with each other, uplink and downlink frequencies are allocated in an orthogonal manner such that at one time instant a certain carrier frequency is used for uplink (downlink) transmission and at some other time instant for downlink(uplink) transmission. Correspondingly, at said one time instant a second carrier frequency is used for downlink (uplink) transmission and at said some other time instant optionally for uplink(downlink) transmission. By duplex communication it is referred to any kind of two-way transfer of information (speech or other true payload data, signalling, pilot signals etc).

As to the utility of the invention, it provides ample transmission diversity due to the FDD or "frequency hopping"

aspect thereof. Furthermore, means to control the transmission units as a function of up-to-date channel state information are provided, thanks to the TDD aspect for its part. For example, in a traditional FDD solution a feedback channel is needed to provide the transmitter with the information about the transmission channel and other related information. By utilizing the invention, such channel information for transmission control can be derived from the information just received on the same frequency. Of course, also explicit feedback data may be sent to the transmitter by the receiving party via a feedback channel derived from the original transmission channel on TDD basis either periodically or upon need or occurrence of a predetermined event. The interference situation is still different at the different ends of a communications link, and so the utilization of explicit feedback data shall not be rashly omitted. Implicit or explicit transmission control data can be used to adjust e.g. transmission coding, beam forming, modulation, power control, rate control, (multi-user) scheduling, channel selection, etc units for arbitrary number of transmit and receive antenna configurations without the need to define feedback channels with high overhead. Still further, many of the current TDD specific advantages like enhanced capacity become now applicable in FDD paired bands as well.

In one aspect of the invention a method for duplex communications comprises the steps of allocating two or more frequencies for information transfer and of transferring information in a first direction on a first number of frequencies belonging to said two or more frequencies and in a second direction on a second number of frequencies belonging to said two or more frequencies but different from the first number of frequencies, characterized in that it further has the step of
   transferring information at a certain time instant on a first frequency belonging to said first number of frequencies in the second transfer direction.

In another aspect of the invention a method for duplex communications between a first and a second transceiver unit is characterized in that it has the steps of
   transferring information during a first time period on a first carrier frequency in a first transfer direction between said first and second transceiver units,
   transferring information during said first time period on a second carrier frequency in a second transfer direction between said first and second transceiver units, and
   transferring information during a second time period substantially on said first carrier frequency in said second transfer direction between said first and second transceiver units.

By wording "substantially" it is highlighted that the carrier frequencies (or frequency bands) at least partly overlap if are not fully identical.

The term "transferring" refers herein to a lower level procedure of transmitting or receiving, or to transmitting and receiving as an aggregate. From a system's viewpoint, the system including a transmitting and a receiving party, both aspects may or may be not referred to in a single step, while from a single communications device's standpoint only one (transmission/reception) aspect is applicable at a time.

In a further aspect of the invention, a communications device comprising a transceiver for wireless duplex communication, further comprising processing and memory means for processing and storing instructions and data, is characterized in that it is configured to
   transfer information during a first time period on a first carrier frequency in a first transfer direction,
   transfer information during said first time period on a second carrier frequency in a second transfer direction, and
   transfer information during a second time period substantially on said first carrier frequency in said second transfer direction.

Yet in a further aspect of the invention a system comprising one or more transceivers capable of duplex data transfer, said system further comprising processing and memory means for processing and storing instructions and data, is configured to allocate two or more carrier frequencies for information transfer characterized in that for the duration of a first time period a first carrier frequency is allocated for information transfer in a first direction and a second carrier frequency allocated for information transfer in a second direction, and for the duration of a second time period said first carrier frequency is allocated for information transfer in said second direction.

It should be noted that the first direction may be interpreted either as the uplink or downlink direction in case of a typical communications system. Likewise, the second direction shall be then interpreted as the downlink or uplink direction, in that order.

BRIEF DESCRIPTION OF THE DRAWINGS

Hereinafter the invention is described in more detail by reference to the attached drawings, wherein FIG. 1 depicts the cited prior art solutions with FDD and TDD approaches.

DETAILED DESCRIPTION OF THE EMBODIMENT OF THE INVENTION

FIG. 1 was already described above in conjunction with the description of relevant prior art.

Figure 2A:
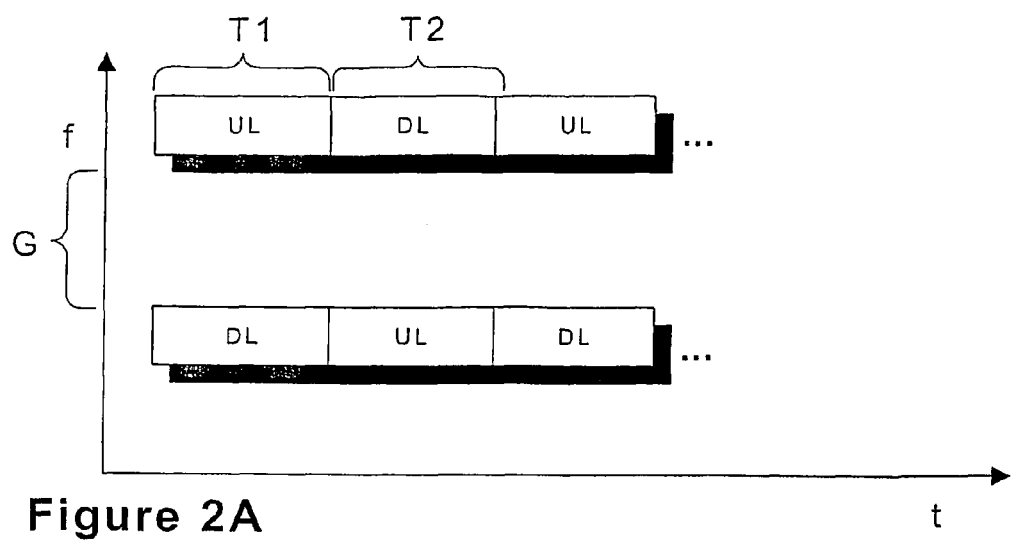
FIGS. 2A, 2B, and 2C illustrate the aforesaid concept of the invention in which both the FDD and TDD techniques are taken into use in a clever manner.
Figure 2B:
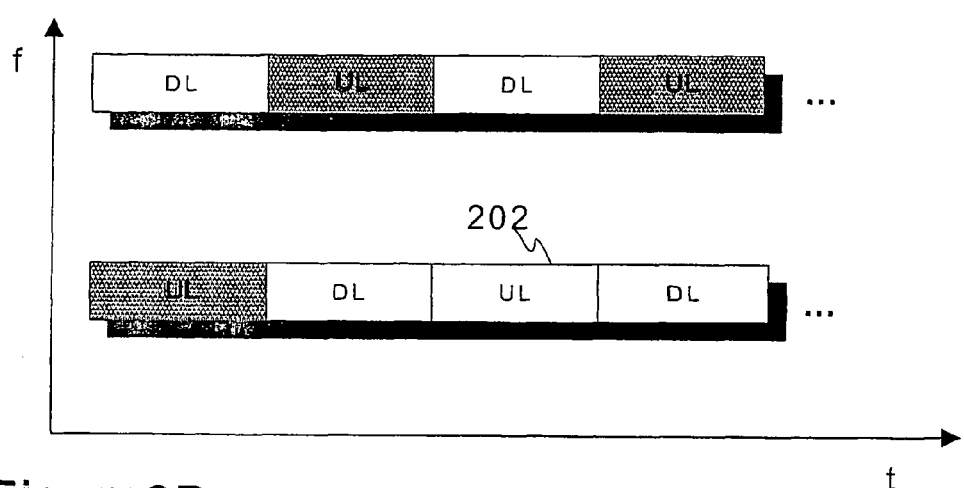
Figure 2C:
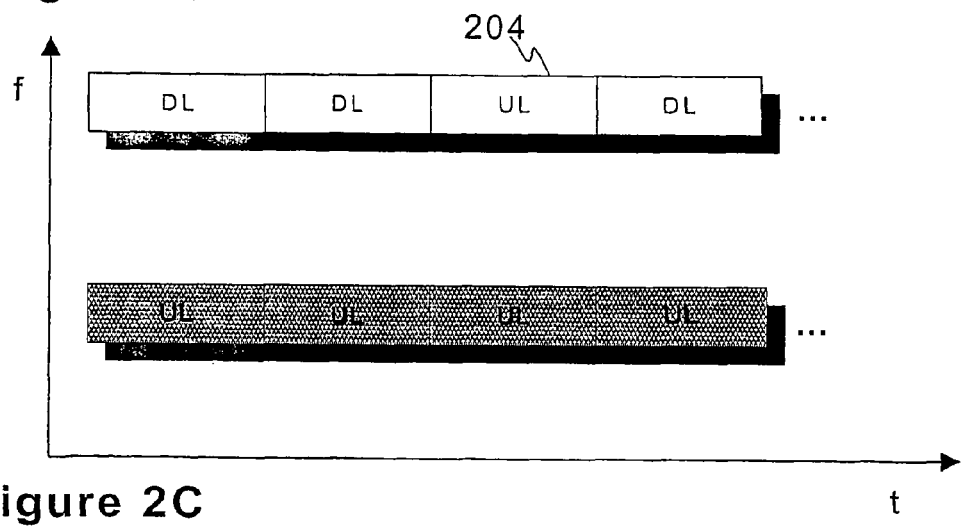

Different scenarios, being only exemplary though, of the invention are sketched out in FIGS. 2A, 2B, and 2C.

FIG. 2A represents a simplest duplex hopping case wherein, in accordance with the FDD aspect of the invention, two or more separate frequencies (or, in practise, frequency bands) are allocated for information (speech or other data, control information etc) transfer and within a certain period T1 one carrier frequency (band) is utilized in UL direction and another carrier frequency in DL direction. Within a second time period T2 in accordance with the TDD aspect of the invention, the carrier frequency utilized in UL direction during period T1 is now utilized in DL direction, and optionally correspondingly, the carrier frequency utilized in DL direction during period T1 is reversely utilized in UL direction. Guard band is marked with reference sign G in the figure.

A time period mentioned herein may refer to and may be concretised as e.g. a number of time slots in addition to any other temporally limited substantially continuous segments. In many existing communication systems UL and DL information transfer directions have a mutual timing offset in relation to e.g. time slot borders, and thus the time period definition as used in this text may differ from the actual time slot borders as defined. One shall also take notice to the fact that during a certain time period allocated for information transfer the actual transfer may still occur taking only a portion, and not the whole duration, thereof.

As the same channel (frequency) that just served as a carrier for data reception is, preferably within time coherence, re-used for also transmitting information, traditional feedback channels for providing the transmitter with channel status information are not necessary. The transmitter may deduct on the basis of the just received information, the information possibly including useful training (~pilot) sequences etc, proper transmission parameters (power, beam (forming) coefficients etc). Consequently, the transmitter is equipped with channel information after the fashion of TDD approach while the frequency hopping approach offers diversity to the transmission in overall sense.

Additionally, at least partially the same (source) information (i.e. transmitted information blocks as a whole comprise redundancy due to e.g. applied channel coding) may be transmitted on a plurality of frequencies to increase the likelihood of successful reception at the far-end, in case of tricky or unknown channel conditions, for example. The channel conditions can be analysed based on the received information.

In FIG. 2B duplex hopping is performed in an environment congruent with the one of FIG. 2A but the UL direction is at least temporarily passive (no traffic). Therefore, DL direction data transfer hops through the frequencies in a periodical manner, but now also occasionally sends 202 e.g. control or parameter (like channel information or test data for analysing the channel like training sequences) data utilizing the otherwise unused UL time period between the DL transmissions. Such periodical control or parameter transmissions may be sent in different frequencies according to the general hopping principle in order to enable analysis of the varying channel conditions at the far-end, for example.

FIG. 2C discloses a further scenario in which a typical FDD allocation procedure has taken place and at least one carrier frequency has been reserved for UL direction and another for DL direction. Both directions may or may not have been active (emerged data transfer) in the past but at least within the time window visualized by FIG. 2C the UL is passive, so no true payload data or signalling is transferred to that direction. Reports on DL reception or some other lesser amount of data may then be periodically sent 204 in the DL band in UL direction provided the necessary guard periods etc are properly defined to avoid interference between the UL/DL transmissions on the same frequency, and the both ends of the communications link are aware of occasional reports (for example, a previous DL transmission unit may have requested a report to be sent in some future time slot).

Figure 3:
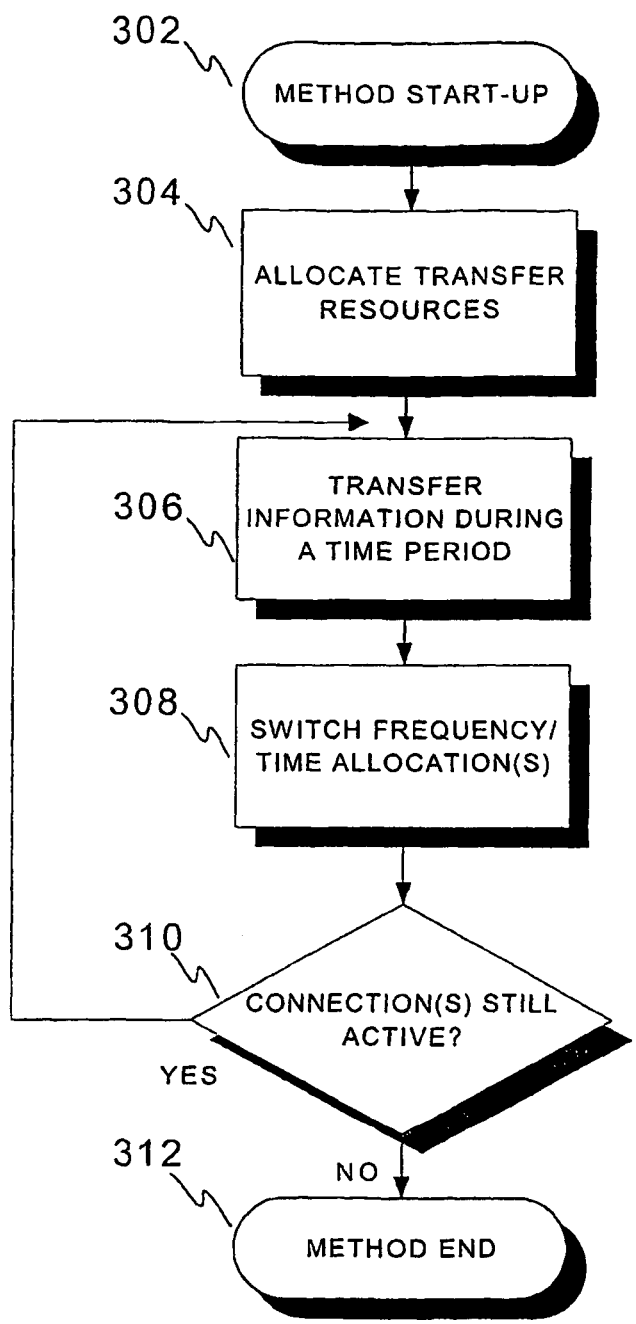
FIG. 3 is a flow chart of the method of the invention.

In view of the above examples, a generic flow chart of a method for utilizing the invention is shown in FIG. 3. In step 302 the method is ramped up and the communications devices transmitting/receiving information are booted, necessary code is loaded to the memories thereof after which the (personal) communications devices may register to the network etc. In step 304 transfer resources are allocated, which may happen either automatically after start-up phase or upon receipt of a data transfer connection request, for example, by associating a number of carriers with a number of devices utilizing them. Moreover, according to the TDD aspect of the invention, certain time periods, e.g. time slots, may be allocated to the number of devices. Furthermore, in the spirit of the invention, necessary sequence listings (like the scrambling codes in the UMTS) that define the applied duplex hopping sequences e.g. in carrier frequency-time period (e.g. time slot) pairs may be associated with and delivered to the devices. That may also happen dynamically at a later stage. In step 306 the information transfer between at least two devices, thus being the transceiver units or separate transmitter and receiver circuits thereof (thus forming a transceiver in a conceptual sense), to be more exact, is initiated by transmitting (~sending) and/or receiving information in a dedicated frequency band during a certain time period according to the defined duplex hopping sequence. In step 308 the devices involved in data transfer activities update their reception/transmission frequency and/or timing information according to the duplex hopping sequences and then switch to a new frequency/time slot configuration. Data transfer is continued according to steps 306 and 308 until there is no more data to be transferred 310. The method is ended in step 312.

Figure 4:
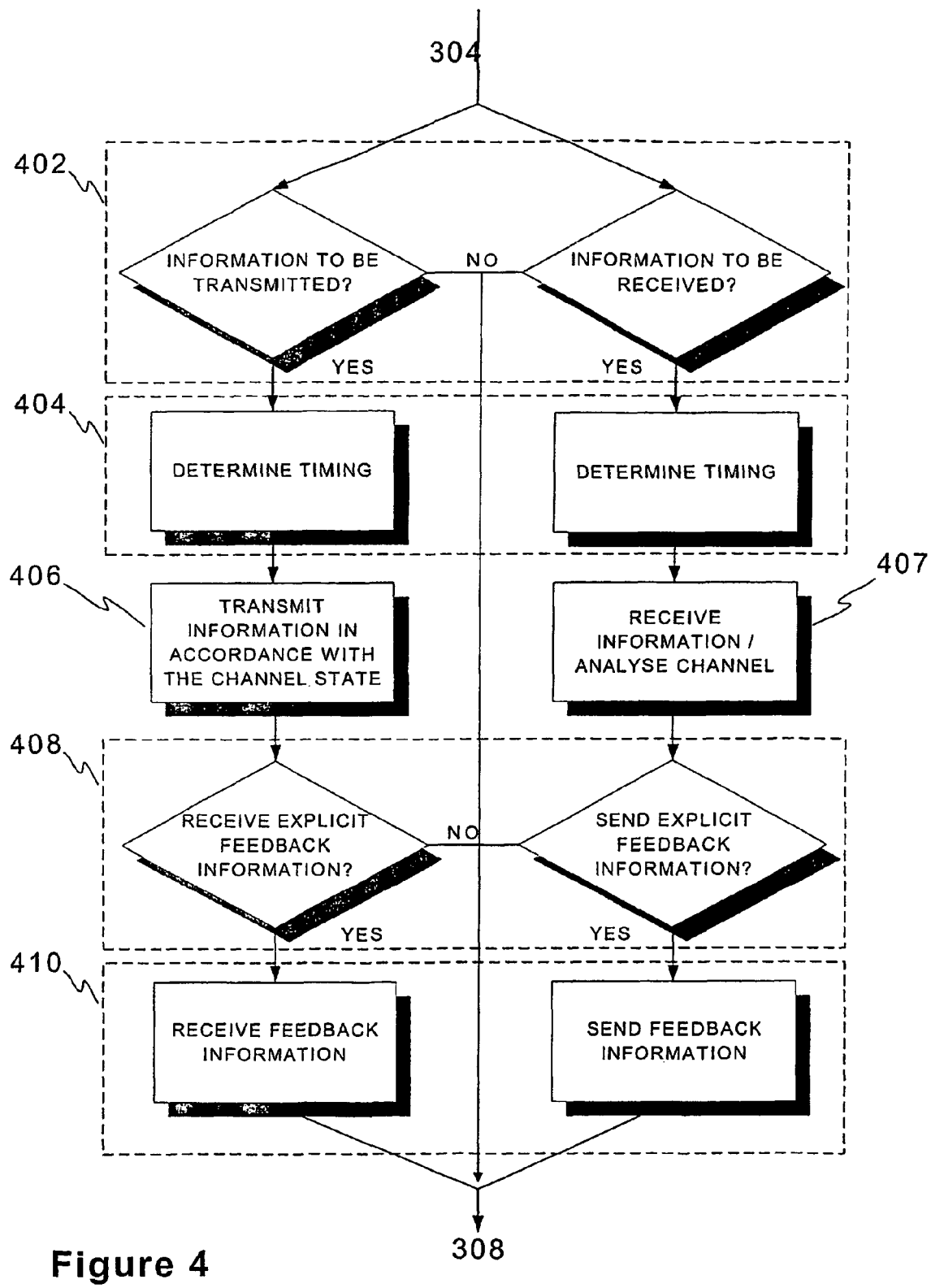
FIG. 4 is a supplementary flow chart of the method of the invention.

FIG. 4 discloses a more detailed option of performing information transfer step 306 of FIG. 3 from a single communications device's perspective, said device being at one end of a communications link applying the principles of the invention.

In step 402 it is checked on a transfer direction basis whether information should be transferred, either transmitted or received, during a time period. If that is the case, a proper timing (e.g. a proper time slot within a period with possible offsets due to the propagation delays etc) is determined 404 for transmitting 406 or receiving 407 information. From the received information, due to e.g. received training sequence, channel parameters may be obtained for use during the data transmission phase on the same (or nearby) frequency. Finally, if explicit feedback information for the transmission/reception is expected 408, such information can be optionally received/transmitted in step 410 during a predetermined time period on a predetermined frequency (being e.g. the same with the recent data transfer or the following one in the sequence).

Generally speaking, the information transfer may occur, as being obvious, between at least two devices such as a wireless communications device and a base station. Moreover, such arrangement may take place in a multiple cell scenario featuring at least two base stations and two wireless communications devices. In such a more complex case, some sort of synchronization, which can be based on e.g. at least partially common duplex sequences between a plurality of neighbouring base stations, is needed between the cells to avoid concurrent transmissions on the same frequency. Alternatively, it's possible to limit the usage of duplex hopping to the immediate proximity of base stations whereas conventional FDD would be utilized in "soft handover" areas with greater distances. For example, a number of sub-carriers may be allocated to duplex hopping and another number for traditional FDD use. "Immediate proximity" can mean, in a wireless transmission sense, a number of different issues such as path loss, channel state, required transmission power etc, or a combination thereof.

Intimated by the examples of FIGS. 2A-2C, duplex hopping is feasible with varying usage resolution; continuous hopping applicable to all communication is possible, but also traditional FDD mode can be used, for example, 99% of the time, and only feedback/training (~pilot) sequences be periodically or upon occurrence of some predetermined event (radically changed channel parameter etc) sent on a "downlink" frequency in uplink direction to the base station by the wireless communications device, for example, as long as the both ends of a connection are aware of frequency-time allocations (like the duplex sequences mentioned before) for a certain number of ongoing time periods. Naturally such allocations may be adaptive and dynamically changed, i.e. the base station updates the sequences due to e.g. activation of new information transfer connections by sending update message on a control channel to the corresponding wireless communications devices affected by the change.

Clearly, orthogonality requirement is preserved if the carriers do not overlap. Suitable carrier frequency allocations in relation to time (duplex hopping sequences) can be constructed by utilizing e.g. Walsh (-Hadamard), Gold, or other known sequences with orthogonal characteristics.

Often, in this concept, due to implementation imperfections, a guard band between carriers is preferred, so is a guard period (~guard time) between time periods associated with different transfer directions. Means to control guard periods are known per se from TDD communications literature (see also e.g. UMTS WCDMA TDD specification), and means to define guard bands (often referred to as guard frequencies or duplex distance) can be considered as either typical regulatory or implementation issues.

There can be several sub-carriers in both uplink and downlink frequencies. The concept as such is independent of any particular digital or analog modulation concept, or multiple-access protocol. It may be used in arbitrary wireless or wired communication networks, such as cellular, cordless, ad-hoc networks, wireless LAN, 3G/4G networks, and so on.

Reverting to the advantages of the invention, inherent channel reciprocity, provided that duplex times are sufficiently short (within time coherence), and the transmission occurs on a frequency on which the information was received within said coherence time, may be used to determine communication parameters for transmission (beam coefficients, coding/modulation options, power control, rate control, scheduling etc) to simplify reception complexity, when e.g. pre-rake combining, or beam forming is done accurately in the transmitter, and to reduce the control channel capacity requirements (ref. TDD vs. FDD closed-loop transmit diversity). From a practical point of view, publication [1] suggests how to apply channel information through a CQI (Channel Quality Indicator) in a multi-user system for scheduling, for example.

Improved diversity, when duplex (frequency) distance is sufficiently large and consecutive slots are transmitted in different frequencies, is another obvious advantage of the invention. The diversity benefit may be used e.g. by sending different parts of a coded information stream via two different duplex bands, e.g. in consecutive slots. Thus, even if one duplex band is in deep fade, the channel decoder (Turbo decoder, convolutional decoder etc) is able to reconstruct the transmitted information.

The invention also offers combined benefits. For example, the transmitter is able to optimize beams (minimize transmission power etc) for each slot due to channel reciprocity. For further reference, utilization of channel information in a TDD system in connection with beam forming is described in publication U.S. Pat. No. 6,584,302. Simultaneously, different slots are transmitted at different frequencies to obtain diversity. Further, the system is able schedule/route the transmission to those frequencies for which the required transmit power would be minimal (e.g. only the better of two frequencies is used). Thus, space-frequency-time resource allocation is simplified, since explicit feedback channels are not mandatory anymore.

Naturally, to use channel reciprocity the receiver has to measure the downlink/uplink channel while possibly simultaneously transmitting on a different frequency channel. Means to enable channel estimation (or methods to obtain more general channel related information) and corresponding channel equalization methods are well known in the art (pilot sequences, matched filter, estimation theory, equalization filters etc). These measurements are thus used both for reception and transmission—the attained channel estimate is used to optimize the transmission method at the given channel using known techniques.

In TDD the transceiver operates at a certain instant either in transmission mode or reception mode, but here possibly simultaneously in both, thereby reducing transfer delay. However, both (uplink/downlink) frequencies are not forced to be active simultaneously. Furthermore, there are no restraints for asymmetric capacity sharing between UL and DL (or in general for two duplex directions) e.g. simply by allocating both duplex frequencies to one duplex direction for a given time interval/proportion, as in TDD (although this typically requires dual transmission chains).

Hereinafter few use cases are given in order to clarify how the current invention could be fitted to already existing systems.

CDMA2000

CDMA2000 system, in contrast to WCDMA, does not have a TDD component. The method of the invention could be used to enhance the capacity of CDMA2000 networks, just like TDD is used to enhance WCDMA. There is no need to define a separate TDD band for this purpose, but, for example, a separate carrier (pair) could be used. Currently HDR (cdma2000-1xDO) specification uses a separate carrier, and combined with a synchronized network operation, even a multi-cell service may be feasible without heavy additional measures for timing control.

GSM/EDGE (Enhanced Data Rates for GSM/Global Evolution)

The frequency reuse distance inherent in TDMA networks allows to mitigate the effect of inaccurate timing control. On the other hand, TDMA networks already include timing control mechanisms, and these can be used with the current invention also, if needed. Direct use of the invented method in TDMA systems may not be simple from a regulatory viewpoint, but the invention would enable to rapid system implementation for GSM/EDGE for some other frequency bands, not currently covered by specifications.

UMTS/WCDMA

UMTS has a TDD mode and there are related means to adjust timing. These can be used also with the current invention, if needed e.g. in a multi-cell case. The invention is applicable at least wherever TDD is applicable, and can therefore be used to further boost the capacity of indoor cells in UMTS, without the need to operate in unpaired band. The network may dictate that a given cell/carrier pair operates in duplex hopping mode. The capacity boost comes from the availability of additional spectrum (paired bands), and in particular from the fact that efficient resource control algorithms are feasible.

For example, accurate beam forming improves capacity and mitigates receiver complexity. If the proposed concept is not used, one needs to define high capacity feedback channels, to attain similar performance (by providing the channel state information via explicit signaling). Thus, the invention provides a new method to convey channel state information to the transmitter, when operating in paired bands. The channel state information (CSI) may be used to devise a transmitter for Multiple-Input Multiple-Output (MIMO) channel wherein optimal or enhanced multi-beam forming and power and rate allocation is used. CSI may be used to select proper a) transport format (coding, modulation method), b) the number of streams to be used in MIMO system, and the associated powers/rates/beams, c) the selection of MIMO/MISO/SIMO/

SISO (Single-Input Single-Output) transmission method in general, d) selection or prioritization of service(s) and/or user(s), and so on.

Figure 5:
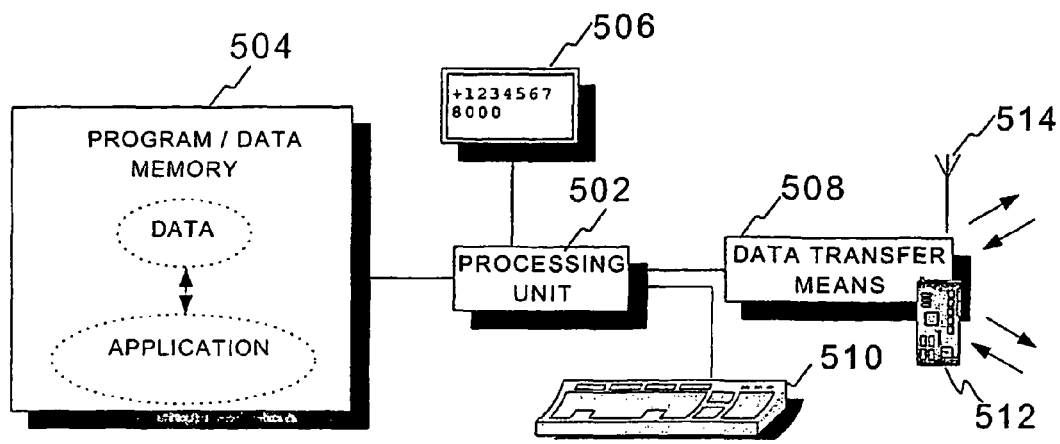
FIG. 5 is a block diagram of a device of the invention.

Considering the equipment for implementing the invention in more detail, FIG. 5 discloses a block diagram of basic components for a communications device such as a base station. Processing unit 502 controls the execution of actions in accordance with instructions (data transfer control application, for example) stored in memory 504 optionally comprising also data such as current frequency-time allocations. Data transfer means 508 may include wireless connectivity means 514 like a radio/infrared transceiver or wireless network (WLAN etc) adapters, or fixed connectivity means 512 such as a conventional network adapter (Ethernet card etc) or a TDMA interface card, for example. Clearly optional keyboard or other data input means 510 and display 506 are useful for providing a user with an interface for managing and controlling the device.

Software for implementing the method of the invention may be provided on a carrier medium like a floppy disk, a CD-ROM, and a memory card, for example.

Figure 6:
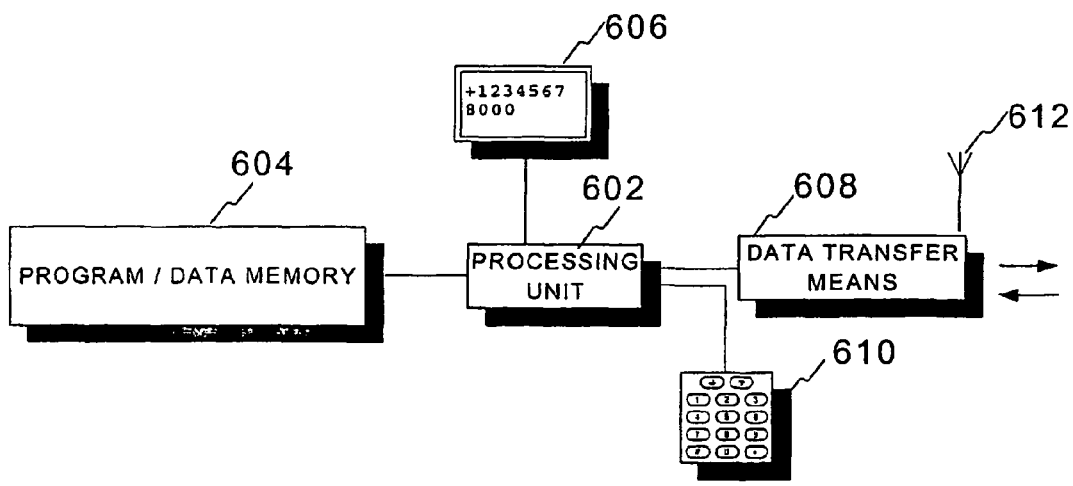
FIG. 6 is a block diagram of another device of the invention.

Likewise, a wireless communications device possibly utilized in the invention, a block diagram of which is shown in FIG. 6, comprises processing means 602, memory means 604, data transfer means 608 like transceiver 612 capable of connecting the wireless communications device to the wireless network via e.g. the base station of FIG. 5, or to some other device, and optionally comprising display 606 in addition to keypad 610 for implementing a sufficient UI.

Both the above communications devices may comprise one or more transmission or reception antennas.

Figure 7A:
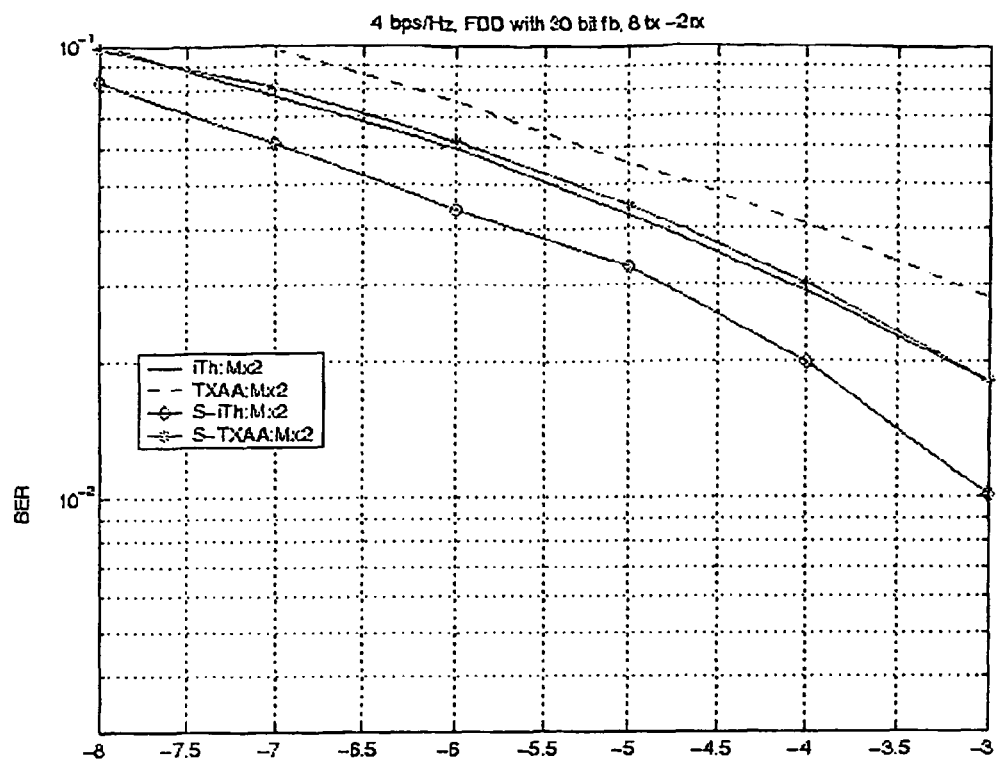
FIGS. 7A and 7B depict a comparison between standard FDD and duplex hopping techniques in one possible use case.
Figure 7B:
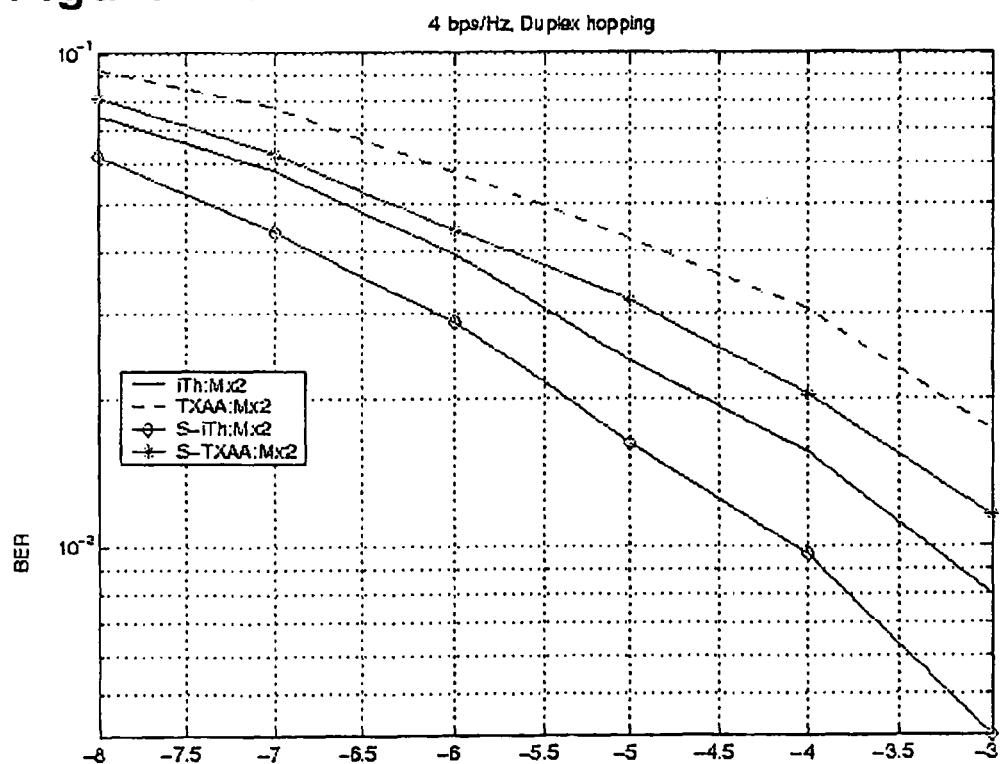

To concretise the effect of duplex hopping in modern telecommunications with MIMO and possibly multi-user characteristics, FIGS. 7A and 7B show the difference between the standard FDD and duplex hopping cases related to one possible scenario. The standard signal model [2] used herein is $$Y=XWH+\text{noise}$$

where Y stands for a matrix corresponding to the received signal, X is the modulation matrix, W is the beam-forming matrix, H is the channel matrix and noise refers to the noise introduced to the signal during the transfer procedure thereof.

For resource allocation and scheduling purposes the transmitter is provided with means to rank transmission resources. The relevant information resides typically at the receiver, as opposed to the transmitter, and therefore needs to be signalled to the corresponding transmitting unit. The exception is the duplex hopping case where, due to channel reciprocity, the CQI may be computed at the transmitter, with possibly interference power (due to other users and noise) signalled only from the receiver. In the signalling based scheme within a conventional FDD system, each receiver is assumed to know the MIMO channel matrix H, e.g. using measurements from common or dedicated pilot channels. The receiver determines conditional channel quality indicator, for a set of feasible beam forming matrices {W}, and determines power allocation, rate allocation, etc. In duplex hopping based FDD scheme, the channel H is known at the transmitter, assuming the terminals send signals that allow the base station to estimate channel H. The selected user specific W, the one that maximizes the selected CQI, is not used at the transmitter until it is selected by the scheduler. Conversely, a greedy scheduler selects the user that has the highest channel quality, although other scheduling, prioritisation, and multiplexing options are clearly also possible. In particular, with duplex hopping the downlink transmission may be jointly optimized for all users.

Finally, to visualize the benefits of duplex hopping, two experiments are carried out, one with the duplex hopping concept, see FIG. 7B, and another with a more conventional concept using explicit feedback signalling, see FIG. 7A. BER ratios are depicted as a function of transmitted signal power per bit per channel use in relation to the noise power per one receiver antenna per channel use. Used modulations attain 4 bps/Hz. Transmitters have been equipped with eight antennas while receivers have two antennas. It is noticed that duplex hopping based feedback improves performance by about 1.5-2 dB over a feedback scheme involving 30 feedback bits. The curves with legends "i-Th" result from two QPSK modulated streams with i-Threaded 2×2 matrix modulation [3], whereas TX-AA refers to single-stream 16-QAM transmission. The figures also indicate performance where the transmission is carried out in better duplex frequency, as selected using channel state information via CQI. Duplex frequency selection (legends "S-TXAA" and "S-iTh") is thus analogous to multi-user diversity with two users, and paves the way for increased performance.

Naturally the above scenario is meant for clarification only, and the achieved real life results may considerably vary depending on the prevailing channel conditions, used transmission parameters, antenna parameters and configurations, etc.

The protocols, protocol stacks as well as the hardware layer components utilized in the information transfer according to the invention can be selected from the existing ones, as the transfer capabilities required for implementing the invention as such are not particularly complex or special, which can be seen as one benefit of the invention. The invention may be realized as an additional software/hardware module or a combination of both to be included in or at least connected to the device requiring the data to be transferred.

It should be obvious to a one skilled in the art that different modifications can be made to the present invention disclosed herein without diverging from the scope of the invention defined by the claims. For example, utilized devices and methods steps or mutual order thereof may vary still converging to the basic idea of the invention. As one observation, the wireless communications device of the invention can, in practise, be categorized as a mobile phone, a PDA, a communication enabled handheld game console/entertainment device etc, for example.

REFERENCES

[1] Ari Hottinen: Multiuser scheduling with matrix modulation, Proceedings of IEEE ISSPIT 2003, December 2003 Darmstadt Germany
[2] A. Hottinen, O. Tirkkonen, R. Wichman: Multi-antenna transceiver techniques for 3G and beyond, John Wiley & Sons, 2003
[3] A. Hottinen, O. Tirkkonen: Precoder designs for high rate space-time block codes, Proceedings of CISS 2004, March 2004 Princeton USA

The invention claimed is:

1. A method for a duplex communication comprising:
allocating two or more frequency bands for information transfer between two entities comprising a first entity and a second entity, and
transmitting, by the first entity, information in a first transfer direction on a first frequency band belonging to said two or more frequency bands and receiving, by the first entity, information in a second transfer direction on a second frequency hand belonging to said two or more frequency bands but different from the first frequency band, a frequency band time allocation concerning said two or more frequency bands being adaptable during the communication between said two entities, said method further comprising analyzing, by the second entity, on a basis of information received by the second entity on said first frequency band in the first transfer direction channel conditions for obtaining at least information about a transfer direction that is passive or unused while receiving said information, adjusting, by the second entity, on a basis of the channel conditions one or more transmission parameters for transmitting information at a certain time instant on said first frequency band in the second transfer direction, and receiving by the second entity, information at said certain time instant on said second frequency band in the first transfer direction, wherein said method is at least part of an overall time allocation of said first frequency band for said first transfer direction and said second transfer direction and of said second frequency band for said first transfer direction and said second transfer direction is based on a predetermined sequence.

2. The method of claim 1, wherein said time instant refers to one or more time slots.

3. The method of claim 1, wherein on a basis of received information one or more parameters describing a transfer channel are established.

4. The method of claim 3, wherein said received information includes data intended for channel estimation.

5. The method of claim 1, wherein on a basis of received information transmission of information on a frequency equal to the reception frequency is optimized.

6. The method of claim 3, wherein the received information includes a training sequence.

7. The method of claim 1, wherein said one or more transmission parameters relate to at least one of the following: transmission power, a beam coefficient, rate control, scheduling.

8. The method of claim 1, wherein an otherwise unused time period is utilized for transferring channel information or test data for channel analysis purposes.

9. The method of claim 1, wherein a device being one of said two entities taking part in the information transfer is provided with information indicating at least one of the following: one or more frequency allocations for the device, one or more time period allocations for the device.

10. The method of claim 1, wherein in a case of two cells, a wireless communications device being one of said two entities and a base station being another of said two entities and communicating with said wireless communications device located in one of said two cells, information transfer within the one of said two cells is synchronized with information transfer in another of said two cells before an occurrence of information transfer between said two entities.

11. The method of claim 10, wherein base stations of said two cells or wireless communications devices of said two cells allocate one at a turn same collectively available frequency or time resources.

12. The method of claim 1, wherein it is further checked whether a distance between a communications device being one of said two entities and a network element being another of said two entities with which the communications device is communicating, is above a certain predetermined limit, and if that is a case, constraining the communications device to use separate frequencies for said first and second transfer directions.

13. The method of claim 10, wherein a number of carriers or sub-carriers are further allocated to standard frequency division duplex (FDD) (Frequency Division Duplex) communication involved in the information transfer between said two entities.

14. The method of claim 12, wherein the distance between the network element and the communications device is determined on a basis of at least one of the following: path loss, channel status, required transmission power.

15. The method of claim 1, wherein allocation of transfer resources between said first and second transfer directions occurs dynamically.

16. The method of claim 1, wherein transmission capacity is allocated unequally between said first entity and said second entity involved in the information transfer.

17. The method of claim 1, wherein a frequency band used in the information transfer is selected from at least two options on a basis of available channel information.

18. The method of claim 1, wherein said duplex communications is wireless communication.

19. The method of claim 18, wherein said first or second transfer direction is an uplink or a downlink direction in a wireless communications system.

20. The method of claim 19, wherein said wireless communications system is compatible with CDMA2000, GSM (global system for mobile communications), EDGE (enhanced data rates for GSM evolution), UMTS (universal mobile telecommunications system), or WCDMA (wideband code division multiple access) technologies.

21. A method for a duplex communication between a first entity and a second entity, a frequency carrier time allocation concerning two or more frequency carriers of said entities being adaptable during the communication between said entities, said method comprising receiving, by the first entity, information during a first time period on a first carrier frequency in a first transfer direction between said first and second entities, transmitting, by the first entity, information during said first time period on a second carrier frequency in a second transfer direction between said first and second entities, and transmitting, by the first entity, information during a second time period on said first carrier frequency in said second transfer direction between said first and second entities, wherein one or more transmission parameters are adjusted for transmitting said information during the second time period on a basis of said information received during the first time period, the received information determining that the first entity adjusts the one or more transmission parameters for transmitting said information during the second time period on said first carrier frequency in said second transfer direction and receives information during said second time period on said second frequency band in the first transfer direction, wherein said method is at least part of an overall time allocation of said first frequency band for said first transfer direction and said second transfer direction and of said second frequency band for said first transfer direction and said second transfer direction is based on a predetermined sequence, wherein channel conditions are analyzed for obtaining at least information about a transfer direction that is passive or unused while receiving said information, and wherein the one or more transmission parameters are adjusted on a basis of the channel conditions.

22. A communications device comprising a transceiver for a wireless duplex communication, further comprising a processing unit and a memory for processing and storing instructions and data, said communication device being capable of adapting a carrier frequency time allocation concerning two carrier frequencies of said communication device and another communication entity during the communication between said communication device and the another communication entity, said communication device is configured to
- receive information during a first time period on a first carrier frequency in a first transfer direction and transmit information during said first time period on a second carrier frequency in a second transfer direction, the device being further configured to
- analyze on a basis of information received on said first carrier frequency in the first transfer direction channel conditions for obtaining at least information about a transfer direction that is passive or unused while receiving said information,
- adjust on a basis of the channel conditions one or more transmission parameters for transmitting information during said second time period on a basis of said information received during the first time period,
- receive information during said second time period on said second carrier frequency in the first transfer direction, wherein at least part of overall time allocation of said first carrier frequency for said first transfer direction and said second transfer direction and of said second carrier frequency for said first transfer direction and said second transfer direction is based on a predetermined sequence.

23. The device of claim 22, wherein each of said first and second time periods refers to one or more time slots.

24. The device of claim 22, configured to, on a basis of the information received during the first time period, establish one or more parameters describing a transfer channel.

25. The device of claim 22, configured to, on a basis of the information received during the first time period, adjust one or more reception parameters.

26. The device of claim 22, wherein said one or more parameters relate to at least one of the following: transmission power, a beam coefficient, rate control, scheduling.

27. The device of claim 22, further configured to utilize an otherwise unused time period for transferring channel information or test data for channel analysis purposes.

28. The device of claim 22, configured to receive information indicating at least one of the following: one or more frequency allocations, one or more time period allocations.

29. The device of claim 22, further configured to utilize separate frequencies for said first and second transfer directions provided a distance to another device involved in the communication is above a certain predetermined limit.

30. The device of claim 29, wherein the distance is determined on a basis of at least one of the following: path loss, channel status, required transmission power.

31. The device of claim 22, configured to select a transmission frequency from at least two options on a basis of available channel information.

32. The device of claim 22, wherein said first or second transfer direction is an uplink or a downlink direction in a wireless communications system.

33. The device of claim 22, configured to transmit information blocks over a plurality of frequencies, said information blocks comprising redundancy between them.

34. The device of claim 22, being a mobile terminal.

35. A system comprising one or more transceivers capable of duplex data transfer, said system further comprising a processing unit and a memory for processing and storing instructions and data, said one or more transceivers being capable of adapting a carrier frequency time allocation concerning two or more carrier frequencies during a communication provided by said one or more transceivers, said system configured to
- allocate said two or more carrier frequencies for information transfer, wherein for a duration of a first time period a first carrier frequency is allocated for information transfer in a first transfer direction and a second carrier frequency allocated for information transfer in a second transfer direction, and for a duration of a second time period said first carrier frequency is allocated for information transfer in said second transfer direction, wherein the one or more transceivers transmitting the information during said second time period is configured to adjust one or more transmission parameters on a basis of said information received by the one or more transceivers during said first time period of information transfer, the received information determining that the one or more transceivers adjust the one or more transmission parameters for transmitting said information during the second time period on said first carrier frequency in said second transfer direction and receive information during said second time period on said second frequency band in the first transfer direction, wherein said system is at least part of an overall time allocation of said first frequency band for said first transfer direction and said second transfer direction and of said second frequency band for said first transfer direction and said second transfer direction is based on a predetermined sequence, wherein channel conditions are analyzed for obtaining at least information about a transfer direction that is passive or unused while receiving said information, and wherein the one or more transmission parameters are adjusted on a basis of the channel conditions.

36. The system of claim 35, wherein said first or second time period refers to one or more time slots.

37. The system of claim 35, further configured to establish one or more parameters describing a transfer channel on a basis of the received information.

38. The system of claim 37, wherein said received information includes data intended for channel estimation purposes.

39. The system of claim 35, configured to adjust one or more reception parameters on a basis of the received information.

40. The system of claim 35, wherein said one or more parameters relate to at least one of a following: transmission power, a beam coefficient, rate control, scheduling.

41. The system of claim 35, configured to utilize an otherwise unused time period for transferring channel information or test data for channel analysis purposes.

42. The system of claim 35, configured to provide the transceiver taking part in the information transfer with the information indicating at least one of a following: one or more frequency allocations for the transceiver, one or more time period allocations for the transceiver.

43. The system of claim 35, configured to, in a case of two cells, a wireless communications device and a base station communicating with said wireless communications device located in one of said two cells, synchronize information transfer in the one of said two cells with information transfer in another of said two cells before an occurrence of information transfer between said two entities.

44. The system of claim 35, configured to allocate frequency or time resources from collectively available frequency or time resources.

45. The system of claim 35, configured to check whether a distance between a communications device and a network element involved in the information transfer is above a certain predetermined limit, and if that is a case, constraining the communications device to use separate frequencies for said first and second transfer directions, wherein said system at least one of said communications device and said network element being the transceiver capable of the duplex data transfer.

46. The system of claim 45, configured to determine the distance on the basis of at least one of the following: path loss, channel status, required transmission power.

47. The system of claim 35, configured to dynamically reallocate transfer resources between said first and second transfer directions.

48. The system of claim 37, configured to select a frequency for the information transfer from at least two options on the basis of available channel information.

49. The system of claim 35, wherein said duplex data transfer is wireless communication.

50. The system of claim 35, wherein said system is a wireless communications system and said first or second transfer direction is uplink or downlink direction in the wireless communications system.

51. The system of claim 35, comprising a base station including at least one of said one or more transceivers.

52. The system of claim 51, further comprising a wireless communications device.

53. The system of claim 35, configured to transmit information blocks over a plurality of frequencies, said information blocks comprising redundancy between them.

54. The system of claim 35, wherein said received information is utilized for multi-user scheduling.

55. The system of claim 35, further comprising a plurality of transmission or reception antennas.

56. The system of claim 55, wherein said received information is utilized in selecting an antenna from said plurality of antennas or in computing an antenna related parameter value.

57. The system of claim 35, wherein said received information is utilized for calculating transmission or reception beams.

58. The system of claim 38, wherein said received information comprises channel state information that is used to select or prioritize at least one of the following: transport format, a number of streams, transmission method, one or more users, and one or more services.

59. A non-transitory computer-readable medium encoded with instructions that, when executed by a computer, perform a method for a duplex communication, where a frequency band time allocation concerning two or more frequency bands being adaptable during the communication, said method comprising
allocating said two or more frequency bands for information transfer between two entities comprising a first entity and a second entity and of transmitting, by the first entity, information in a first transfer direction on a first frequency band belonging to said two or more frequency bands and receiving, by the first entity, information in a second transfer direction on a second frequency band belonging to said two or more frequency bands but different from the first frequency band, said method further comprising
analyzing, by the second entity, on a basis of information received by the second entity on said first frequency band in the first transfer direction channel conditions for obtaining at least information about a transfer direction that is passive or unused while receiving said information, and
adjusting, by the second entity, on a basis of the channel conditions one or more transmission parameters for transmitting information at a certain time instant on said first frequency band in the second transfer direction, and
receiving, by the second entity, information at said certain time instant on said second frequency hand in the first transfer direction, wherein said method is at least part of an overall time allocation of said first frequency band for said first transfer direction and said second transfer direction and of said second frequency band for said first transfer direction and said second transfer direction is based on a predetermined sequence.

60. A non-transitory computer-readable medium encoded with instructions that, when executed by a computer, perform a method for a duplex communication, where a frequency band time allocation concerning two or more frequency bands of first and second entities being adaptable during the communication between first and second entities, said method comprising
receiving, by the first entity, information during a first time period on a first carrier frequency in a first transfer direction between said first and second entities,
transmitting, by the first entity, information during said first time period on a second carrier frequency in a second transfer direction between said first and second entities, and
transmitting, by the first entity, information during a second time period on said first carrier frequency in said second transfer direction between said first and second entities, wherein one or more transmission parameters are adjusted for transmitting said information during the second time period on a basis of said information received during the first time period, the received information determining that the first entity adjusts the one or more transmission parameters for transmitting said information during the second time period on said first carrier frequency in said second transfer direction and receives information during said second time period on said second frequency band in the first transfer direction, wherein said method is at least part of an overall time allocation of said first frequency band for said first transfer direction and said second transfer direction and of said second frequency band for said first transfer direction and said second transfer direction is based on a predetermined sequence, wherein channel conditions are analyzed for obtaining at least information about a transfer direction that is passive or unused while receiving said information, and wherein the one or more transmission parameters are adjusted on a basis of the channel conditions.

* * * * *

UNITED STATES PATENT AND TRADEMARK OFFICE
CERTIFICATE OF CORRECTION

PATENT NO. : 8,842,581 B2  Page 1 of 1
APPLICATION NO. : 10/592899
DATED : September 23, 2014
INVENTOR(S) : Hottinen It is certified that error appears in the above-identified patent and that said Letters Patent is hereby corrected as shown below:

In the Claims

Claim 1, col. 10, line 66 "hand" should be deleted and --band-- should be inserted.

Claim 59, col. 16, line 15 "hand" should be deleted and --band-- should be inserted.

Signed and Sealed this
Sixth Day of January, 2015

Michelle K. Lee
*Deputy Director of the United States Patent and Trademark Office*